United States Patent
Massonnat (10) Patent No.: US 8,359,184 B2
(45) Date of Patent: Jan. 22, 2013

(54) METHOD, PROGRAM AND COMPUTER SYSTEM FOR SCALING HYDROCARBON RESERVOIR MODEL DATA

(75) Inventor: Gérard Massonnat, Idron (FR)

(73) Assignee: Total S.A., Courbevoie (FR)

( * ) Notice: Subject to any disclaimer, the term of this patent is extended or adjusted under 35 U.S.C. 154(b) by 280 days.

(21) Appl. No.: 12/668,394

(22) PCT Filed: Jul. 9, 2008

(86) PCT No.: PCT/FR2008/000996
§ 371 (c)(1),
(2), (4) Date: Jan. 8, 2010

(87) PCT Pub. No.: WO2009/034253

PCT Pub. Date: Mar. 19, 2009

(65) Prior Publication Data
US 2010/0191514 A1     Jul. 29, 2010

(30) Foreign Application Priority Data

Jul. 9, 2007 (FR) .................................... 07 04950

(51) Int. Cl.
*G06F 17/50* (2006.01)
(52) U.S. Cl. .................. 703/2; 703/9; 703/12
(58) Field of Classification Search ............. 703/2, 5–7, 703/9, 12; 166/250; 367/73
See application file for complete search history.

(56) References Cited

U.S. PATENT DOCUMENTS

| | | | |
|---|---|---|---|
| 5,838,634 A * | 11/1998 | Jones et al. | 367/73 |
| 7,254,091 B1 * | 8/2007 | Gunning et al. | 367/73 |
| 2010/0185424 A1 | 7/2010 | Massonnat | |
| 2010/0312529 A1 * | 12/2010 | Souche et al. | 703/2 |
| 2011/0290478 A1 * | 12/2011 | Sun et al. | 166/250.01 |
| 2011/0308792 A1 * | 12/2011 | Le Ravalec et al. | 166/250.01 |

OTHER PUBLICATIONS

International Searching Authority, International Preliminary Report on Patentability (translation) for PCT/FR2008/000996, dated Jun. 3, 2010, 11 pages.
International Searching Authority, International Search Report for PCT/FR2008/000996, dated Feb. 6, 2009, 2 pages.
Noetinger B et al, Permeability Averaging for Well Tests in 3D Stochastic Reservoir Models, Society of Petroleum Engineers (SPE 36653) presented at Annual Technical Conference and Exhibition Oct. 6-9, 1996, 7 pages.
International Searching Authority, International Preliminary Report of Patentability (translation) for PCT/FR2008/000997, dated Jun. 3, 2010, 6 pages.

(Continued)

*Primary Examiner* — Thai Phan
(74) *Attorney, Agent, or Firm* — Polsinelli Shughart PC (57) ABSTRACT

A method, program and computer system for changing scale of reservoir model permeabilities (for example a hydrocarbon reservoir) are provided. Mini-models of reservoirs are defined (S100) with a number of meshes and cells in these meshes. For each model mesh, a scaling of the permeability values $K_H$ of the meshes is carried out (S400-800) via a mean power formula $K_H^{\omega_H} \propto \Sigma k_{H_i}^{\omega_H}$ relating the mesh permeability $K_H$ to the local permeabilities $k_{H,i}$ of the cells. According to the invention, the power coefficient $\omega_H$ appearing therein is analytically modified, relatively to its expression given by the Noetinger-Haas relationship, in order to correct a non-ergodicity bias.

16 Claims, 7 Drawing Sheets

OTHER PUBLICATIONS

Haas. A. et al., *Stochastic Reservoir Modelling Constrained by Well Test Permeabillities*, Geostatistics Wollongong '96, vol. 1, 1997, pp. 501-511, Copyright 1997 Kluwer Academic Publishers, Netherlands.

Noetinger B. et al., *The future of stochastic and upscaling methods in hydrogeology*, Journal of Hydrogeology 2005 vol. 13 pp. 184-201.

Renard P., *Modelisation des ecoulements en milieux poreux heterogenes: calcul des permeabilites equivalentes (Flow Modeling in heterogeneous propous media: calculating equivalent permeabilities)*, Ecole Des Mines de Paris No. 32, 1997, 258 pages, translation of relevant sections provided.

Wen X. et al., *High Resolution Reservoir Models Integrating Multiple-Well Production Data*, Society of Petroleum Engineers, Inc., Copyright 1997, pp. 115-129.

Zheng S. et al., *Uncertainty in well test and core permeability analysis: a case study in fluvial channel reservoirs, northern North Sea, Norway*, The American Association of Petroleum Geologists, vol. 84, No. 12, Dec. 2000, pp. 1929-1954.

\* cited by examiner

METHOD, PROGRAM AND COMPUTER SYSTEM FOR SCALING HYDROCARBON RESERVOIR MODEL DATA

The present invention relates to a method, a program and a computer system for scaling hydrocarbon reservoir model data.

Economic challenges related to the oil industry require the possibility of describing realistically the geological structure of hydrocarbon reservoirs and the properties of the rocks which make them up.

By reservoir, is meant a sufficiently porous and permeable rock for it to be able to contain fluids (water, oil, gas). These rocks (limestones, dolomites, sandstones) are of economic interest if their volumes are sufficient and if they are covered by impermeable layers preventing the fluid from escaping. A reservoir for example is a sedimentary deposit or a series of connected deposits which contains fluids (oil, gas, water . . . ). These deposits comprise porous and permeable rocks inside which fluids flow. These fluids may possibly accumulate forming a deposit.

A "facies" is a category in which a rock or a soil may be placed, and which is determined by one or more lithological features (lithofacies) or palaeontological features (biofacies). This term is also used for designating a category corresponding to a medium or a sedimentation domain.

The permeability of the rock determines its capability of letting through the fluid. Porosity is the percentage of empty space inside the rock and gives the volume of fluid which the latter may contain, whence its interest as regards oil prospecting.

Permeability and porosity are two fundamental petrophysical properties which one seeks to determine in order to describe the reservoir and its quality. These properties are not uniform in the whole reservoir, but depend on the geological structures which make it up. Heterogeneity of the reservoir results from this. Knowledge of the reservoir implies the determination of such heterogeneities.

A goal of characterizing reservoirs is to describe as accurately as possible the petrophysical features of the porous medium. In the case of hydrocarbon reservoirs, characterizing a reservoir represents an important economic challenge for different reasons: it should notably allow proper estimation of the exploitable reserves and provide information for a better localization of production wells. By characterizing it, it is therefore possible to provide assistance for deciding on the course of development of the deposit and more generally, it provides assistance with regards to oil field development and production.

In more details, understanding a reservoir requires good knowledge of the nature of the rocks and of the fluids which make it up, of the stresses and pressures to which it is subject, as well as its structure and its shape. Various characterization technologies are required for accessing this knowledge. Among these technologies, a distinction may be made between experimental characterization techniques and characterization techniques which aim at interpreting experimental data (interpretation, simulation, etc.).

The techniques used for determining the characteristics of a deposit are based on geophysics, in particular seismics, and geology.

Seismics especially provide the shape of the deposit, sometimes also the variations in the rock types and the boundaries between fluids (water, oil, gas).

Geology, in particular sedimentology, defines the nature of sedimentary deposits which are at the origin of the types of rocks (examples: sandstone, limestone, clay . . . ) present in the reservoirs. By a detailed study of the sedimentary background, it is possible to infer qualitative and quantitative information on the extension and heterogeneities present in the different types of rocks (facies).

On the experimental level, so-called exploratory or appraisal drillings have the purpose of getting better acquainted with the reservoirs by taking real samples of rocks and fluids. The data extracted from these drillings are of different natures and correspond to different investigation volumes:

Cores, from core drilling operations, allow characterization of the sedimentary nature of the rocks and of their petrophysical features (porosity, permeability measured in the laboratory). In this respect, core drilling is an operation which consists, during drilling, of taking samples of soils, either in the bottom of the hole, or sideways, i.e. from its walls.

Logs are indirect measurements of the nature of the rock and of the fluids in the immediate surroundings of the wells. Logging consists of measuring, after or during drilling, the characteristics of the rocks crossed, by means of different probes. In a general way, logging designates any recording of a characteristic of a geological formation crossed by a borehole, depending on the depth. Logs complete the information drawn from the cores, and concern a more reduced scale. Core and logging techniques for example allow evaluation of the permeability and small scale porosity of a reservoir.

Well tests consist of evaluating the actual behavior of the reservoir during a production phase (pressure, flow rate . . . ). They allow indirect characterization of the quality of the reservoir in a domain of a typically hectometric size around the wells. Well tests have today become very efficient means for determining the dynamic characteristics of complex reservoirs. These tests are based on measurements of pressure drops and rises related to the opening and closing of production valves. For example they allow evaluation of the apparent (or effective) permeability of a reservoir.

Characterization of the reservoirs also consists of producing a synthesis of all these data in order to form a representation as accurate as possible of the reservoir, both with regard to its extension and its volume and to its "quality", i.e. its petrophysical features. This representation may be used as a basis for evaluating the benefit from the development of the relevant deposit.

In order to be able to manage the complexity of the reservoirs and to at best form a hierarchy of the influence of the numerous phenomena and parameters, it is important to be able to have available a description of the transport of fluids in these media.

In more details, in order to conduct development and production of a reservoir, and to predict its dynamic behavior depending on various production conditions, one often resorts to numerical simulations on flow models. Geostatic models used for representing the geological structure of the reservoir (permeability, porosity, etc.) require discretization consisting of a large number of meshes and cells in these meshes, the number of cells may attain tens of millions.

These finely meshed models are populated with values of petrophysical variables such as porosity and permeability, by observing the variogram. The variogram is a function currently used in geostatistics, with which the heterogeneity of a phenomenon may be quantified. It is expressed by means of:

the horizontal correlation length $L_H$; and
the vertical correlation length $L_V$.

The vertical correlation length ($L_V$) is obtained by means of a logarithmic representation of local permeability. On the other hand, the horizontal correlation length ($L_H$) is a datum which is more difficult to measure, which is generally evaluated by the geologist. The ratio $L_H/L_V$ is a measure of geostatistical anisotropy.

These finely meshed models are populated with petrophysical variables such as porosity and permeability before being used in flow simulations. However, the numerical simulation time increases drastically, i.e. exponentially with the number of cells in the model, which may lead to very long computation times for very finely discretized models.

In order to achieve flow simulations within a reasonable computation time, one practice consists of building a coarse simulation model, by grouping cells in meshes and by assigning to the meshes an equivalent property calculated from local properties. This is the operation which is called "upscaling". By changing the scale from a fine scale to a larger scale, it is possible to limit the number of simulated cells. A reduced number of cells, after change in scale, allows faster computation. The change in scale is a main problem in the field of geostatistics; it is involved in many applications (computations of average block contents in the mining field, of average porosities in the oil field, etc.).

Porosity is changed by simply taking the arithmetic mean of the porosities in the fine mesh.

The change in scale for permeability is not so simple. The physical meaning of apparent or effective permeability is that of a coefficient in Darcy's equation. The apparent permeability is the value of the homogenous permeability which emerges in a large domain, whereas local permeability is itself heterogeneous and at a finer scale. Apparent permeability is not an additive quantity. In fact, homogenized permeability is not necessarily the arithmetic mean of the permeabilities. Generally there is no means for analytically obtaining the value of the effective permeability. Therefore most often, one has to be satisfied by an approximated value of permeability.

This has been the subject of many investigations in the field of reservoir simulation. A method for changing scale should ideally provide an appropriate apparent (or effective) permeability, capturing the behaviors of the fluids of the system at cell (or fine mesh) level.

Different approaches for studying the change in scale of permeability have been proposed, for example the following publications may be consulted:

Wen X.-H. and al. "High Resolution Reservoir Models Integrating Multiple-Well Production Data". SPE 38728, Annual Technical Conference and Exhibition of the Society of Petroleum Engineers, San Antonio, 1997; and Renard P., "Modélisation des écoulements en milieux poreux hétérogènes: calcul des perméabilités équivalentes" (*Flow modeling in heterogeneous porpous media: calculating equivalent permeabilities*). Thesis, Ecole des Mines de Paris, Paris, 1999. Among the known techniques for changing scale, mention may be made of:

analytic and algebraic methods which propose simple analytic rules for a plausible calculation of the equivalent permeabilities without solving a problem of flow; and numerical techniques for changing scale wherein, in order to calculate the equivalent permeability, one is led to solving the pressure P and velocity v fields of a local or global flow problem; the pressure solver method based on Darcy's equation is conventionally used. These numerical techniques are efficient but require long and costly computation steps.

Among the algebraic methods, the method of the mean power formula has proved to be most particularly effective; it consists of linking the apparent (large scale) permeability K to a power $\omega$ via the formula:

$$K^\omega = \frac{1}{N} \times \sum_{i=1}^{i=N} k_i^\omega. \quad (1)$$

Thus the problem of calculating the equivalent permeability in analytical methods boils down to estimating the exponent $\omega$ with which the error induced by the change in scale may be minimized.

In particular, when dealing with permeability, the following formula was proposed:

$$\omega = \frac{\operatorname{Arctan}\alpha}{\pi - \operatorname{Arctan}\alpha} \quad (2)$$

with $$\alpha = \frac{L_H}{L_V} \sqrt{\frac{k_v}{k_H}},$$

where $k_v/k_H$ and $L_H/L_V$ designate the petrophysical and geostatistical anisotropies (see for example Haas, A. and Noetinger, B. (1995) 3D Permeability Averaging for Stochastic Reservoir Modelling Constrained by Well Tests, Reservoir Description Forum. The Heriot-Watt and Stanford University, 10-14 September, Puebles Hydro, UK.). This relationship is valid within the scope of an exponential variogram model, which assumes a so-called "lognormal" distribution of the local permeability data, whether the variance-over-mean ratio is small and there being no (or very little) spatial correlation.

A problem which is however posed with these methods is that of the reliability of the obtained results.

On the other hand, so-called numerical methods, for example based on the pressure solver have increased reliability. However, they have high computation cost. The problem, starting with such methods, is therefore to reduce the computation time.

There remains therefore a need for a new scaling method. Ideally, this method should provide reliability of the known numerical techniques but at a reduced computation cost.

Additionally, before the change in scale, the problem of integrating well data and well tests into the estimation of the facies proportions (or probabilities) may be posed. In such a context, it may be important to be able to conciliate or evaluate the relevance of different types of small scale data so as to be then able to populate a (computer/numerical) reservoir model. The problem of conciliation of these data is that the latter are very numerous and difficult to handle at computer level.

Accordingly, the first object of the invention is to provide a novel scaling method, providing reliability comparable with that of numerical techniques but with a reduced computation cost relatively to the latter. It should also preferably allow the aforementioned data conciliation problem to be solved.

Whatever the case, this method should allow improvement of tools for assisting decision making based on the characterization of hydrocarbon reservoirs. In fine, with this method, exploitation of a hydrocarbon reservoir should be facilitated.

This goal is achieved by means of a method for scaling model data of a reservoir, e.g. a hydrocarbon reservoir, implemented by means of a computer, comprising the steps of:

defining a set of reservoir models each comprising a number of meshes with given dimensions, these meshes each comprising a number of cells; and receiving statistical data relative to porosity and permeability, which may be applied to each of the models of said set;

for each of the models:

assigning to the cells, values of permeabilities $k_{Hi}$ and of porosity $\Phi_{Hi}$, depending on said statistical data;

for each mesh of the model, scaling a permeability value $K_H$ of the mesh, on the basis of a mean power formula $K_H^{\omega_H} \propto \Sigma k_{H_i}^{\omega_H}$, which relates the permeability $K_H$ of the mesh to the permeabilities $k_{H_i}$ of the cells via the power coefficient $\omega_H$ of the Noetinger-Haas relationship $$\omega_H = \frac{\text{Arctan}\alpha}{\pi - \text{Arctan}\alpha},$$

this power coefficient $\omega_H$ being analytically modified in order to correct a non-ergodicity bias due to the dimensions of the relevant mesh; and determination of porosity and permeability values of the reservoir by means of the set of the reservoir models, using the scaled mesh permeabilities.

In preferred embodiments, the method according to the invention comprises one or more of the following characteristics:

the step for providing statistical data comprises the provision of: porosity and penetrability distribution laws; as well as a variogram defined by correlation lengths $L_H$, $L_V$ along two distinct directions H, V, these laws and variogram being applicable to each of the models of said set; in the step for scaling the permeability value $K_H$: the power coefficient $\omega_H$ is analytically modified by a non-ergodicity parameter $\epsilon$ depending on mesh dimensions $D_H$, $D_V$, according to the relationship $$\omega_H = \frac{\text{Arctan}\alpha}{\pi - \text{Arctan}\alpha},$$

wherein $$\alpha = \frac{L_H}{L_V}\sqrt{\frac{k_V}{k_H}}\epsilon,$$

and $k_V/k_H$ and $L_H/L_V$ designate the petrophysical and geostatistical anisotropies of the model, respectively, said anisotropies depending on the provided statistical data;

in the scaling step, the power coefficient $\omega_H$ is analytically modified by two non-ergodicity parameters $\epsilon_V$, $\epsilon_H$ relative to two distinct directions H, V, according to the relationship $$\omega_H = \frac{\text{Arctan}\alpha}{\pi - \text{Arctan}\alpha},$$

wherein $$\alpha = \frac{L_H}{L_V}\sqrt{\frac{k_V}{k_H}}\epsilon_H \epsilon_H;$$

the non-ergodicity parameters $\epsilon_V$, $\epsilon_H$, depend on respective limiting values $(D_H/L_H)_{loss}$ and $(D_V/L_V)_{loss}$, below which the non-modified power coefficient $\omega_H$ varies substantially;

the non-ergodicity parameters $\epsilon_V$, $\epsilon_H$ also depend on the mean m and on the variance σ of the permeability of the model, the mean m and variance σ depending on the provided statistical data;

the method according to the invention further comprises, for each model: a step for determining by means of an analytical model distributions of non-ergodicity parameters, $\epsilon_V$, $\epsilon_H$; a step for drawing non-ergodicity parameter values $\epsilon_V$, $\epsilon_H$, preferentially larger than 10, from said distributions of non-ergodicity parameter values, so as to obtain a number of corrected non-ergodicity parameter values $\epsilon_V$, $\epsilon_H$; and a step for determining a distribution of values of the power coefficient $\omega_H$ depending on the corrected non-ergodicity parameter values $\epsilon_V$, $\epsilon_H$;

the method according to the invention further comprises a step, for each of the models, for calculating: a porosity value of each of the meshes of the model, for example involving an arithmetic mean of the porosities of the cells of the meshes; and as many corrected permeability values of each of the meshes of the model as there are accomplished drawings of corrected non-ergodicity parameter values $\epsilon_V$, $\epsilon_H$;

the non-ergodicity parameter(s) is(are) expressed as a function $\epsilon_{V/H} = f(X_{V/H})$ wherein $X_{V/H}$ depends on: the ratio $(D_{V/H}/L_{V/H})$ of a dimension $D_{V/H}$ of the mesh to the correlation length of the model, and on the limiting value $(D_{V/H}/L_{V/H})_{loss}$ of this ratio, and wherein the function $\epsilon_{V/H} = f(X_{V/H})$ satisfies the condition: $\text{Lim}\epsilon_{V/H} \rightarrow 1|_{(D_{V/H}/L_{V/H}) \rightarrow (D_{V/H}/L_{V/H})_{loss}}$;

$$X_{V/H} = 1 - \frac{(D_{V/H} L_{V/H})}{(D_{V/H}/L_{V/H})_{loss}},$$

and the function $\epsilon_{V/H} = f(X_{V/H})$ is of the polynomial type:

$$\epsilon_{V/H} = 1 + \sum_{i=1...} X_{V/H}^i;$$

The method according to the invention further comprises preliminary steps for conciliating hydrocarbon reservoir model data, said preliminary steps comprising: the provision of a set of local permeability values $k_{Hi,r}$ and of a value of an apparent permeability $K_{H,r}$ of the reservoir; and the numerical calculation of a value of a power coefficient $\omega_{H,r}$ from a mean power formula of the $K_{H,r}^{\omega_{H,r}} \propto \Sigma k_{H_i,r}^{\omega_{H,r}}$ relating the apparent permeability $K_{H,r}$ to the local permeabilities via the power $\omega_{H,r}$; and from the set of local permeability values $k_{Hi,r}$ and the apparent permeability value $K_{H,r}$; the comparison of the calculated power $\omega_{H,r}$ with a reference value; and depending on this comparison, the modification of the values provided in the provision step;

said preliminary conciliation steps further comprising before the calculation step, a step for establishing a relationship $K_{H,r}^{\omega_{H,r}} = f(\{k_{H_i,r}^{\omega_{H,r}}\}_{i=1,N})$ from the mean power formula for numerically calculating the value of the power $\omega_{H,r}$; and the apparent permeability value $K_{H,r}$ is relative to a direction distinct from a direction of a well of the reservoir, e.g. a direction perpendicular the direction of the well The invention also relates to a computer program product, the program comprising routines for executing steps of the method according to the invention, when said program is executed on a computer.

The invention further relates to a computer system comprising a memory containing a program comprising routines for executing the steps of the method according to the invention, when said program is executed.

Other characteristics and advantages of the invention will become apparent upon reading the detailed description which follows, of the embodiments of the invention, given exclusively as an example and with reference to the appended drawings which illustrate.

The invention in its main lines relates to a method for changing the scale of permeabilities of a (e.g. hydrocarbon) reservoir model. Mini-models of reservoirs are defined, with a number of meshes and of cells in these meshes. For each model mesh, scaling of the permeability values $K_H$ of the meshes is carried out via a mean power formula $K_H^{\omega_H} \propto \Sigma k_{H_i}^{\omega_H}$, relating the mesh permeability $K_H$ to the local permeability $k_{HI}$ of the cells. According to the invention, the power coefficient $\omega_H$ appearing therein is analytically modified, as compared with its expression given by the Noetinger-Haas relationship in order to correct a non-ergodicity bias.

Ergodicity is defined, at least within the scope of the present invention, as a property expressing the fact that in a process, each sample which may be taken into consideration is also representative of the whole, from a statistical point of view. On the other hand, by non-ergodicity, is meant that a sample is not representative of the whole, always from a statistical point of view.

In this respect, it was realized within the scope of the present invention, that the Noetinger-Haas formula would apply when the ergodicity conditions are observed, i.e., when the investigation volume (i.e. the one in which the power mean of the local permeabilities is performed) is sufficiently large.

However, it was also realized that at the typical scale of the mesh (i.e. about 50×50×1 m, this volume may be not applied by a factor ranging from 0.5 to 3) the ergodicity conditions are not observed. In concrete terms, the use of the mean power formula leads to a more or less marked bias in the permeability values depending on the dimensions of the relevant mesh. It was therefore contemplated to correct the power coefficient $\omega_H$ analytically and this for example by a non-ergodicity coefficient $\epsilon$.

An originality of the present invention is that with the performed analytical correction the mentioned bias may be directly corrected at the mesh. Thus, the subsequently calculated permeability values of the reservoir are free of the bias which the customary scaling analytical methods have otherwise. It is therefore possible to resort to a scaling method which is at least partly analytical, which provides reliability comparable with that of numerical techniques but with a reduced computation cost as compared with the latter. In practice, in a case when scaling requires a computation time of several days with a numerical method, the scaling according to the invention, as for it, requires a reduced computation time of a few minutes. The initial goal however was the reliability of the results, which up to now was only provided by numerical methods. By realizing the problem which is posed with analytical methods, i.e. the non-ergodicity bias, it finally proved advantageous to reconsider a so-called "analytical" approach. Therefore, for equivalent reliability, instead of resorting to a so-called numerical method, it is possible to have recourse to a so-called analytical method.

In particular, an object of the present invention is to provide a method for correcting the power coefficient depending on the non-ergodicity of the permeability of the medium in "small volumes" formed by the meshes of the model. In this respect, the power coefficient $\omega_H$ is for example simply and effectively corrected via a non-ergodicity parameter $\epsilon$ depending on the dimensions $D_H$, $D_V$ of a defined mesh, according to the relationship:

$$\omega_H = \frac{\text{Arctan}\alpha}{\pi - \text{Arctan}\alpha}, \quad (3)$$

wherein $$\alpha = \frac{L_H}{L_V}\sqrt{\frac{k_V}{k_H}}\,\epsilon,$$

In the latter expression, $k_V/k_H$ and $L_H/L_V$ designate the petrophysical and geostatistical anisotropies of the model, respectively, which may be considered as input data of the model. The computation cost for performing the correction is minimum in this case.

Typically, the ratio $L_H/L_V$ measuring the geostatistical anisotropy is greater than 10. The ratio $k_V/k_H$ measuring the petrophysical anisotropy is comprised between 0.01 and 1. This ratio is measured at a small scale, on plugs or logs, or even estimated by a geologist.

Preferably, one defines $$\epsilon = \epsilon_H, \epsilon_V \quad (4)$$

wherein $\epsilon_V$, $\epsilon_H$ are ergodicity parameters relative to two distinct directions H, V. These directions are defined depending on the geological layers and/or the well direction. Generally, the well is perpendicular to these layers. The direction V relates to the direction of the well (typically vertical direction) and the direction H to a direction perpendicular to the latter (typically a horizontal direction). In this way, the power coefficient $\omega_H$ is modified according to the relationship $$\omega_H = \frac{\text{Arctan}\alpha}{\pi - \text{Arctan}\alpha}, \quad (5)$$

wherein $$\alpha = \frac{L_H}{L_V}\sqrt{\frac{k_V}{k_H}}\,\varepsilon_H\varepsilon_V$$

Also, a non-ergodicity parameter may be contemplated which involves $\epsilon_x$, $\epsilon y$, $\epsilon z$, in a Cartesian system, or further $\epsilon_r$, $\epsilon_\theta$, $\epsilon_z$, in polar coordinates, $\epsilon_r$, $\epsilon_\theta$, $\epsilon_\phi$ in spherical coordinates, etc.

The non-ergodicity parameters may in any case be expressed analytically in various ways, so as to correct the non-ergodicity bias due to the dimensions of the relevant mesh in the mini-model. A trial-and-error method may be used for refining the analytical representation of these non-ergodicity parameters.

However, it appears that the effective power coefficient $\omega_H$ (i.e. the coefficient which would have to be considered so that the equations 1 and 2 above do not give rise to a bias) varies substantially when the dimensions of the mesh are such that the ratios $(D_H/L_H)$ and $(D_V/L_V)$ are less than limiting values $(D_H/L_H)_{loss}$ and $(D_V/L_V)_{loss}$. The ratios $(D_H/L_H)_{loss}$ and $(D_V/L_V)_{loss}$ are therefore limiting values of the ratios $(D_H/L_H)$ and $(D_V/L_V)$ from which the ergodicity conditions are met at the scale of the mesh. Below these limiting values, the averaging coefficient $\omega_H$ should be corrected by at least one non-ergodicity parameter $\epsilon$.

It is therefore advantageous to model the non-ergodicity parameters as functions not only of the dimensions of the mesh and of the correlation lengths $L_H$ and $L_V$ but also of the limiting values of the ratios $(D_H/L_H)$ and $(D_V/L_V)$, in order to effectively take into account non-ergodicity.

The invention is implemented by means of a computer: a program is designed for applying the steps of the method according to the invention. The corresponding application typically comprises modules assigned to various tasks which will be described and makes available a suitable user interface, providing input and handling of the required data. The relevant program is for example written in Fortran, if necessary supporting object programming, in C, C++, Java, C#, (Turbo)Pascal, Object Pascal, or more generally stemming from object programming.

Figure 1:
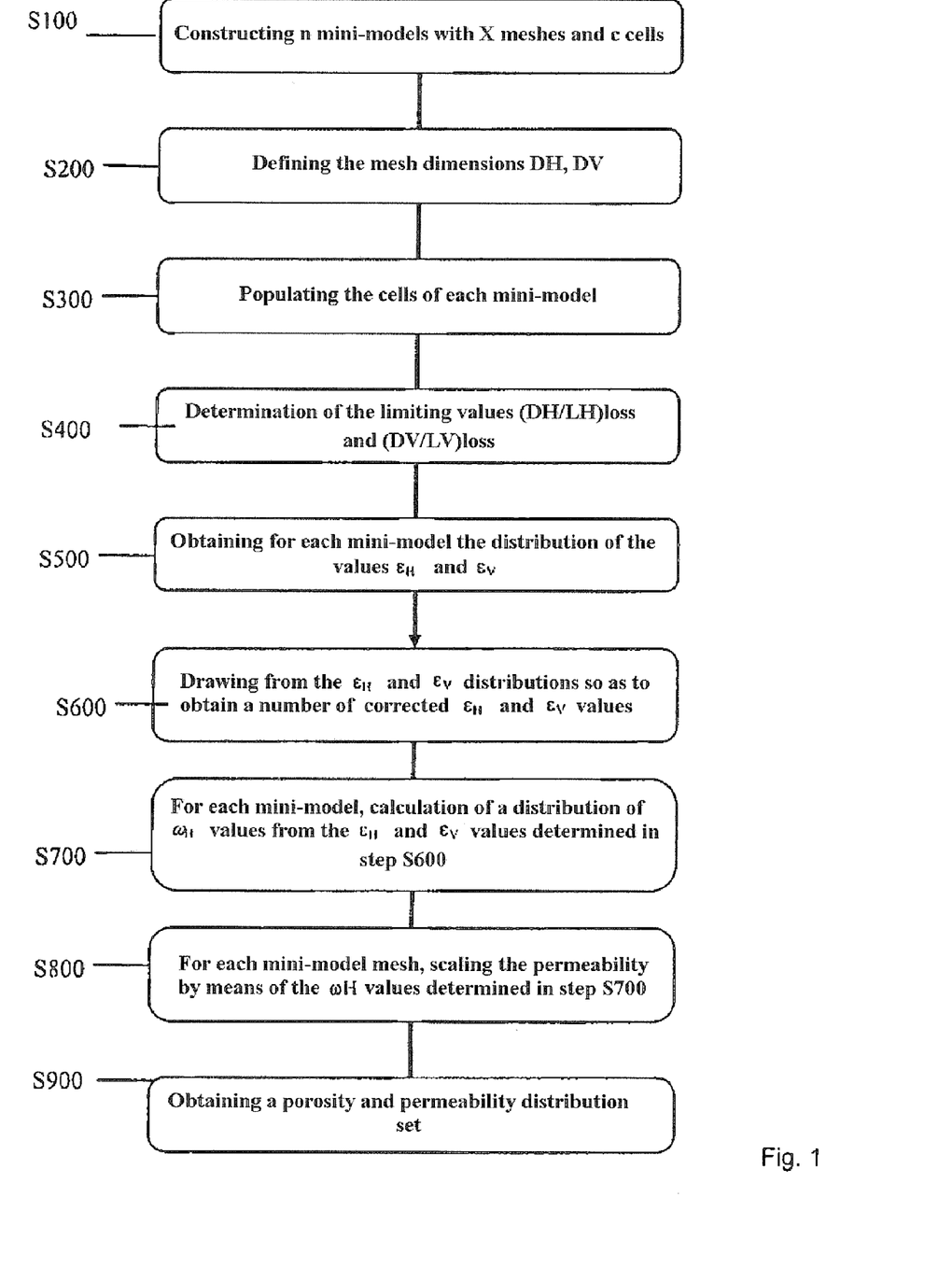
FIG. 1: a flowchart of steps of a method according to an embodiment of the invention.

FIG. 1 shows a flowchart illustrating steps of the method according to an embodiment of the invention. With reference to FIG. 1, the method according to the invention comprises a step S100 for defining a set of reservoir models (or mini-models), each comprising given numbers of meshes and cells.

Figure 2:
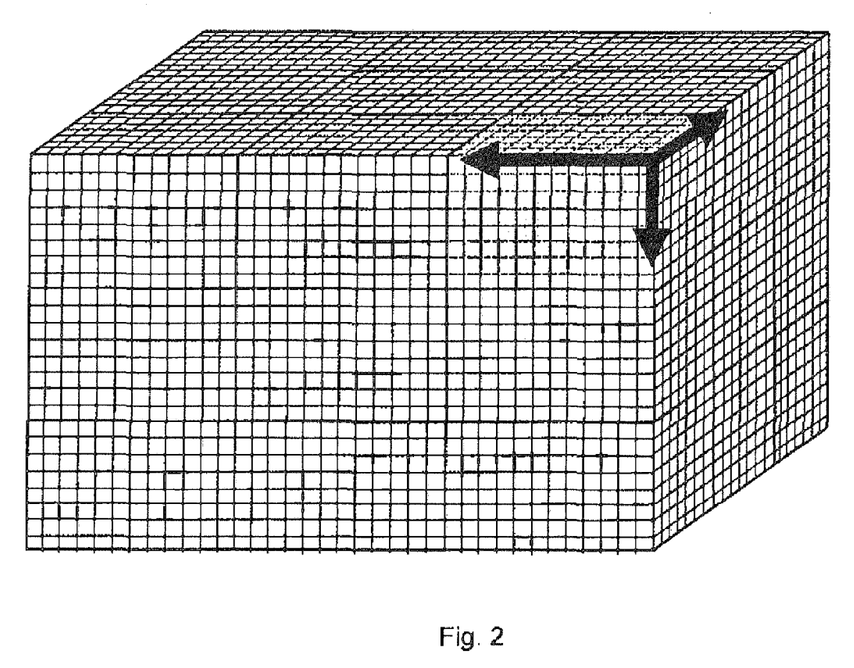
FIG. 2: an illustration of an exemplary mini-model.

An exemplary reservoir mini-model is illustrated in FIG. 2: the relevant model comprises 27 meshes, which each contain 1,152 cells. Such a model therefore comprises more than 31,000 cells.

Again with reference to FIG. 1, the dimensions of the mesh are defined in step S200: this may involve a user selection, which for example defines a value $D_H$ and a value $D_V$ which correspond to mesh dimensions along the horizontal and vertical directions, with reference to the direction of the well.

Next, the application loads statistical data relative to the reservoir, in particular data related to porosity and permeability. This is conventionally performed via the user interface. For example, the user clicks on "File", and then on "Open", then selects a drive, a directory or an Internet location containing the corresponding file. In the list of directories, he/she then localizes and opens the directory containing the file. The operations involving the user are standard ones and will not be more detailed subsequently.

The loaded data are applicable to each of the models of the whole reservoir. These data for example comprise porosity and permeability distributions as well as the variogram, defined by correlation lengths (or spans) $L_H$, $L_V$, along the directions H, V. The variogram thereby provides a measure of the spatial continuity of a property. The span $L_V$ is measured at the well, for example on the log. The span $L_H$ is generally estimated by the geologist.

These data are preferably consistent data and capable of being used as a support for proper development of the modeling which will follow. To do this, these data are conciliated beforehand, for example according to the embodiments which will be described with reference to FIG. 5. In this respect, the span $L_H$ may further be obtained within the scope of the data conciliation method which will be described with reference to this figure.

Next, in step S300 and for each of the mini-models, the application assigns to the cells of the model, permeability values $k_{Hi}$ and porosity values $\Phi_{Hi}$ (i=1 to . . . ) is depending on said statistical data. The idea here is to populate the whole of the cells of the mini-model while observing the horizontal and vertical porosity, permeability distributions, as well as the variogram. Various techniques from applied statistical mathematics are known for making this possible. The permeability and porosity distribution laws are therefore not necessarily observed at the scale of the mesh, in the statistical sense, but they are at the scale of the mini-model.

Preferably, in step S400 (and still for each mini-model) the limiting values $(D_H/L_H)_{loss}$ and $(D_V/L_V)_{loss}$ are then determined. This may be accomplished by means of tables accessible to the application and this will be detailed below. As this will be seen subsequently, the non-ergodicity parameters $\epsilon_V$, $\epsilon_H$ which one seeks to obtain, are also preferably a function of the mean in and variance $\sigma$ of the permeability of the model. These mean m and variance a are themselves inferred from statistical data provided above or then provided at the same time as the latter. Subsequently, as the ratios $k_V/k_H$ and $L_H/L_V$, the permeability mean in and variance $\sigma$ are constants for each mini-model, a single value $(D_H/L_H)_{loss}$ and $(D_V/L_V)_{loss}$ per mini-model is therefore obtained.

Next, in step S500, the application determines non-ergodicity parameter values $\epsilon_V$, $\epsilon_H$ by means of the mesh dimensions and the statistical data and the $(D_{V/H}/L_{V/H})_{loss}$ values mentioned earlier. In particular, with the dimensions of the input meshes and the provided statistical data, the ratio $(D_H/L_{V/H})$ of a dimension $D_{V/H}$ of the mesh to the correlation length of the model may be calculated.

In the present embodiment, the method also comprises a step (step S500) for determining distributions of these non-ergodicity parameters $\epsilon_V$, $\epsilon_H$. This, as this will be seen later on, may be obtained from optimistic, median and pessimistic estimations ($\epsilon_{max}$, $\epsilon_{med}$ and $\epsilon_{min}$) of these parameters, according to a method which will be described later on.

A step for drawing non-ergodicity parameter values $\epsilon_V$, $\epsilon_H$, preferentially more than 10 of them, may be contemplated as in step S600. This drawing is accomplished from said distributions of non-ergodicity parameter values. With such a drawing, it is possible to obtain a number of corrected ergodicity parameter values $\epsilon_V$, $\epsilon_H$.

Next, in step S700, the power coefficient $\omega_H$ may be analytically modified by means of the non-ergodicity parameters $\epsilon_V$, $\epsilon_H$ for correcting the non-ergodicity bias. Preferably, a distribution of values of the power coefficient $\omega_H$ is determined, depending on the corrected non-ergodicity parameter values $\epsilon_V$, $\epsilon_H$ which have been calculated.

Now, for each mini-model mesh (and for each of the latter), the application scales (step S800) the mesh permeability values $K_H$. As described earlier, this is accomplished on the basis of the mean power formula $K_H^{\omega H} \propto \Sigma k_{H_i}^{\omega H}$ with a modified coefficient $\omega_H$. In more detail, since a distribution of $\omega_H$ values has been calculated, a plurality of corrected permeability values is obtained. Taking into account the foregoing, as many corrected permeability values as there are accomplished drawings of ergodicity parameter values $\epsilon_V$, $\epsilon_H$, are obtained in particular.

For each mini-model mesh, in fine and at least one porosity value and one permeability value are obtained (by means of the method according to the invention). In practice, and according to the embodiment described above, a single porosity value (obtained by the arithmetic mean of the porosities of the corresponding cells) and several permeability values corresponding to the whole of the accomplished drawings are obtained. A number of permeability values and of porosity values of the reservoir are thus determined with the help of the set of reservoir mini-models (step S900). For example n mini-models are made, with n preferentially comprised between 10 and 100. A porosity and permeability distribution set is thereby obtained. Distribution derivation is known per se in the art.

Figure 3:
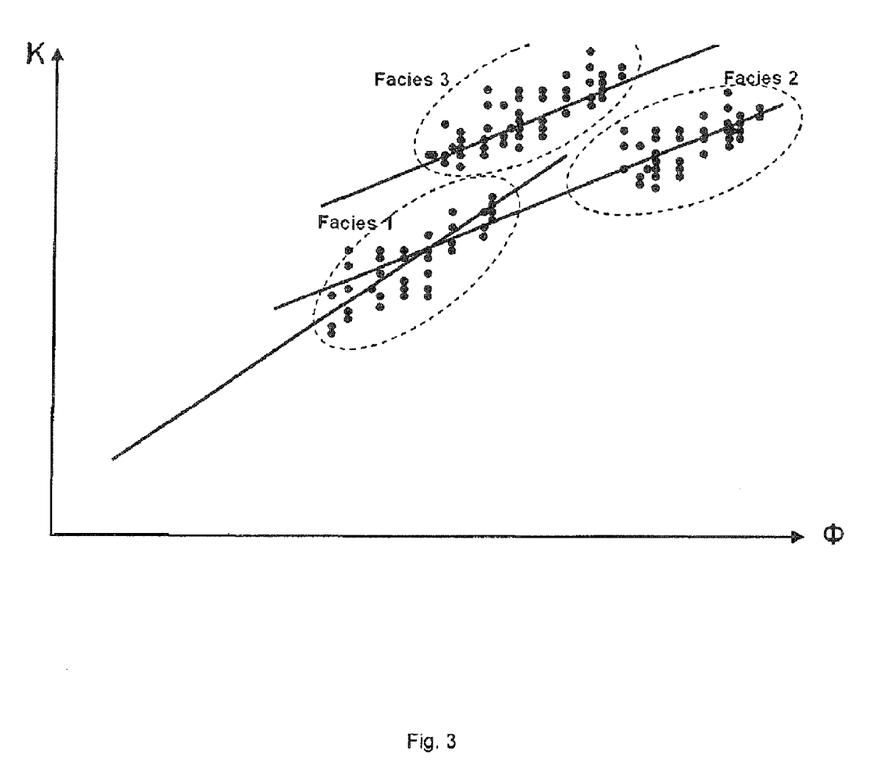
FIG. 3: an example of distributions illustrated on a cross plot.

The obtained set of distributions may be illustrated on a cross plot, as illustrated in FIG. 3, which represents how the permeabilities K are distributed as a function of the porosity value $\Phi$.

Preferably, a graphical assistant guides the user for the graphical representation and subsequent utilization of the obtained data.

The application thereby provides an efficient and reliable decision-making tool based on enhanced characterization of hydrocarbon reservoirs. Finally, with the method according to the invention, modeling of the data of hydrocarbon reservoirs and subsequently industrial exploitation of this reservoir may be facilitated. It is clear that if modeling of the reservoir is enhanced because it is more effective, subsequent exploitation of the reservoir is also enhanced.

Figure 4:
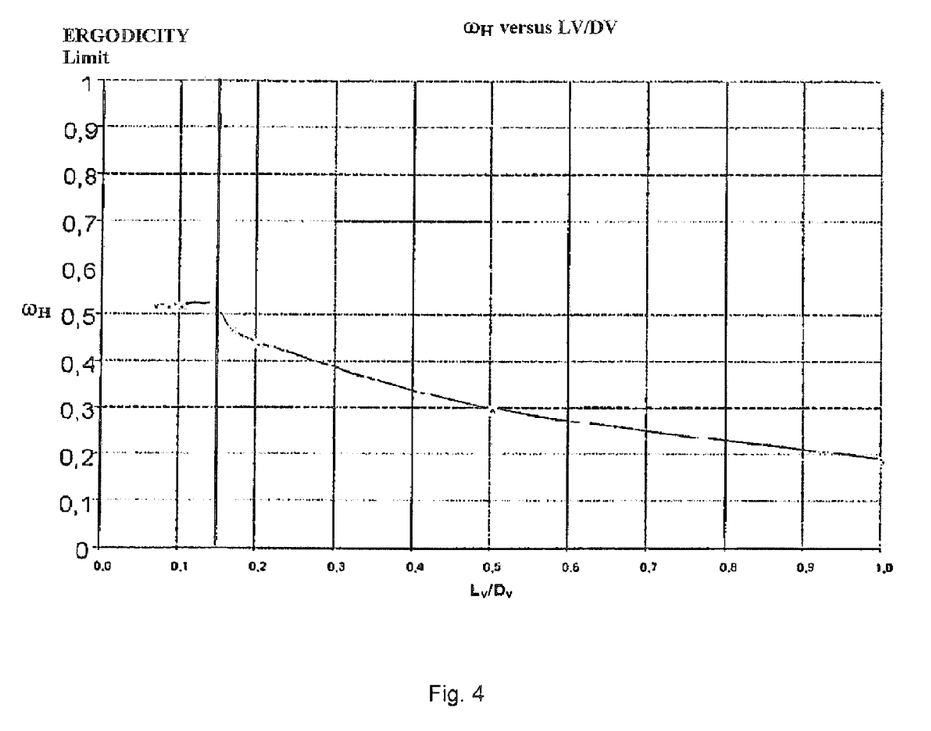
FIG. 4: an exemplary representation of $\omega_H$ versus $L_V/D_V$, below and beyond a threshold value equal to about ⅟₇.

Now reference will be made to FIG. 4, illustrating the variation of the coefficient $\omega_H$ as a function of the $L_V/D_V$ ratio. It should be noted that this ratio is the reciprocal of the ratio used, mentioned up to now, i.e. ($D_V/L_V$), whence the aspect of the curve.

As described earlier, the non-ergodicity parameters may be expressed analytically in various ways. They should however be designed so as to effectively correct the non-ergodicity bias due to the dimensions of the relevant mesh.

Indeed as described earlier, it was ascertained experimentally that the coefficient $\omega_H$ depends on the investigation volume defined by $D_H$ and $D_V$ and more precisely on ($D_H/L_H$) and ($D_V/L_V$). From a certain value of these ratios ($D_H/L_H$) and ($D_V/L_V$), this coefficient $\omega_H$ is constant (as illustrated in FIG. 4). The ergodicity conditions are then found. The limiting values, i.e. below which the ergodicity conditions are no longer observed, are denoted as ($D_H/L_H)_{loss}$ and ($D_V/L_V)_{loss}$. Finally below these limiting values, $\omega_H$ does not only depend on the ratios $k_V/k_H$ and $L_H/L_V$, but also on ($D_H/L_H$), ($D_V/L_V$), ($D_H/L_H)_{loss}$ and ($D_V/L_V)_{loss}$, whence the correction proposed by the invention.

It therefore proves to be advantageous to model the non-ergodicity coefficients as functions of ($D_H/L_H$) and ($D_V/L_V$) as well as of ($D_H/L_H)_{loss}$ and ($D_V/L_V)_{loss}$.

In practice, the ergodicity parameters may for example be expressed as a function $\epsilon_{V/H} = f(X_{V/H})$, wherein $X_{V/H}$ depends on the ratio ($D_{V/H}/L_{V/H}$) and on its limiting value ($D_{V/H}/L_{V/H})_{loss}$. Taking into account the preceding observations, the function $\epsilon_{V/H} = f(X_{V/H})$ should preferably tend to 1 when ($D_{V/H}/L_{V/H}$) tends to its limiting value ($D_{V/H}/L_{V/H})_{loss}$ which is further noted as:

$$Lim\epsilon_{V/H} \to 1 \mid_{(D_{V/H}/L_{V/H}) \to (D_{V/H}/L_{V/H})_{loss}}.$$

In particular, a simple scheme is the following:

$$X_{V/H} = 1 - \frac{(D_{V/H}/L_{V/H})}{(D_{V/H}/L_{V/H})_{loss}},$$

and the function $\epsilon_{V/H} = f(X_{H/V})$ is of the polynomial type, i.e.:

$$\varepsilon_{V/H} = 1 + \sum_{i=1...} X_{V/H}^i;$$

Knowing the span values $L_V$ and $L_H$, the ratio $k_V/k_H$ and the permeability mean m and variance a statistical coefficients of the model (provided or inferred from the provided data) the limiting values ($D_H/L_H)_{loss}$ and ($D_V/L_V)_{loss}$ may be determined by tables obtained experimentally, i.e. the minimum mesh size from which ergodicity is observed.

These tables may for example be obtained by numerical experimentation, by using the known pressure solver method, based on Darcy's law. To do this, the $\omega_H$ coefficient as obtained on sub-models with variable dimensions, is plotted, by resorting to the mean power formula $K_H^{\omega H} \propto \Sigma k_{H_i}^{\omega H}$. An example is illustrated in FIG. 4, in which it is seen that the coefficient is no longer constant beyond a threshold value.

Typically the following tables (Tables 1 to 4) are obtained, showing the results of suitable values for ($D_{V/H}/L_{V/H})_{loss}$ versus given values of the ratios $\sigma/m$, $k_V/k_H$ and

TABLE 1

Values of ($D_H/L_H)_{loss}$ for $\sigma/m = 1$
$L_H/L_V$.
($D_H/L_H)_{loss}$ for $\sigma/m = 1$

| | | $k_V/k_H$ | |
|---|---|---|---|
| | | 0.1 | 1 |
| $L_H/L_V$ | 1 | 22 | 20 |
| | 5 | 6 | 5 |

TABLE 2

Values of ($D_H/L_H)_{loss}$ for $\sigma/m = 3$
($D_H/L_H)_{loss}$ for $\sigma/m = 3$

| | | $k_V/k_H$ | |
|---|---|---|---|
| | | 0.1 | 1 |
| $L_H/$ | 1 | 18 | 16 |
| $L_V$ | 5 | 3 | 2.5 |

TABLE 3

Values of ($D_V/L_V)_{loss}$ for $\sigma/m = 1$
($D_V/L_V)_{loss}$ for $\sigma/m = 1$

| | | $k_V/k_H$ | |
|---|---|---|---|
| | | 0.1 | 1 |
| $L_H/L_V$ | 3.33 | 6 | 6 |
| | 10 | 10 | 10 |

TABLE 4

Values of $(D_V/L_V)_{loss}$ for $\sigma/m = 3$
$(D_V/L_V)_{loss}$ for $\sigma/m = 3$

| | | $k_V/k_H$ | |
|---|---|---|---|
| | | 0.1 | 1 |
| $L_H/L_V$ | 3.33 | 4.3 | 4.3 |
| | 10 | 6 | 6 |

As described above, the distributions of these non-ergodicity parameters $\epsilon_V$, $\epsilon_H$ may be obtained from optimistic, median and pessimistic estimations ($\epsilon_{max}$, $\epsilon_{med}$ and $\epsilon_{min}$) of these parameters. The relevant estimations are provided by known analytical tools.

It was thereby possible to experimentally determine formulae giving the coefficients $\epsilon_{Hmax}$, $\epsilon_{Hmed}$ and $\epsilon_{Hmin}$ as a function of the $(D_H/L_H)$ and $(D_H/L_H)_{loss}$ ratios. Also formulae were determined giving the coefficients $\epsilon_{Vmax}$, $\epsilon_{Vmed}$ and $\epsilon_{Vmin}$ as a function of the $(D_V/L_V)$ and $(D_V/L_V)_{loss}$ ratios. By considering the variable $X_H$ defined by:

$$X_H = 1 - \frac{(D_H/L_H)}{(D_H/L_H)_{loss}},$$

$\epsilon_{Hmax} = 495.01 X_H^6 - 656.69 X_H^5 + 293.86 X_H^4 - 38.14 X_H^3 - 1.52 X_H^2 + 1.00 X_H + 1$ $\epsilon_{Hmed} = -38.50 X_H^6 + 122.43 X_H^5 - 114.01 X_H^4 + 45 X_H^3 - 7.78 X_H^2 + 0.94 X_H + 1$ $\epsilon_{Hmin} = -20.38 X_H^6 + 60.8 X_H^5 - 61.06 X_H^4 + 26.92 X_H^3 - 5.19 X_H^2 + 0.39 X_H + 1$ are obtained for $\epsilon_H$.

Also considering the variable $X_V$ defined by:

$$X_V = 1 - \frac{(D_V/L_V)}{(D_V/L_V)_{loss}},$$

$\epsilon_{Vmax} = 3.86 X_V^6 - 8.94 X_V^5 + 7.05 X_V^4 - 2.85 X_V^3 + 0.48 X_V^2 - 0.12 X_V + 1$ $\epsilon_{Vmed} = 1.25 X_V^6 - 0.42 X_V^5 - 2.80 X_V^4 + 2.59 X_V^3 - 1.29 X_V^2 - 0.12 X_V + 1$ $\epsilon_{Vmin} = -2.10 X_V^6 - 5.98 X_V^5 + 7.28 X_V^4 - 3.77 X_V^3 - 0.13 X_V^2 - 0.48 X_V + 1$ are obtained for $\epsilon_V$.

Preferably, a module is provided in the application applying the method of the invention which allows the user to refine the analytical expression of the ergodicity coefficient depending on provided statistical data of reservoirs.

The method for conciliating data mentioned earlier will now be described, which is if necessary involved before the processing discussed above.

The method in its main lines consists in a method for conciliating data intended to populate a hydrocarbon reservoir (computer) model as described earlier. A set of values of local permeabilities $k_{Hi,r}$ of the reservoir and a value of an apparent permeability $K_{H,r}$ of the reservoir are provided. These provided data are typically in a very large number. One then proceeds with calculating a value of a power $\omega_{H,r}$, from a mean power formula, relating the apparent permeability $K_{H,r}$ to the local permeabilities via the power $\omega_{H,r}$ and previous values. By resorting to an analytical model, the handling of the numerous local data is simplified. Unlike the use described above, the relevant formula is diverted here from its initial purpose i.e. calculating an apparent value and only requires the calculation of a sum of local data, each of these data being raised to the power of $\omega_{H,r}$. The "computer cost" is therefore modest and allows efficient handling of these data, even in a large number. To do this, a scheme for inverting this formula is for example established, in order to calculate a value of the power. Next, the calculated value of $\omega_{H,r}$ is compared with a reference value and, depending on this comparison, the initially provided data are possibly modified. The steps may possibly be repeated until a satisfactory set of data is obtained, i.e. a set of conciliated data. These conciliated data may then be used for modeling a reservoir and allow estimation of its characteristics. Exploitation of the reservoir is finally facilitated.

It should be noted that the problem of non-ergodicity may be set aside as regards conciliation of the data.

Subsequently, the lower index "r" (intended to distinguish the notations in the conciliation method from the previous ones) is omitted for reasons of clarity: in particular, $\omega_{H,r}$ therefore becomes $\omega_H$.

Figure 5:
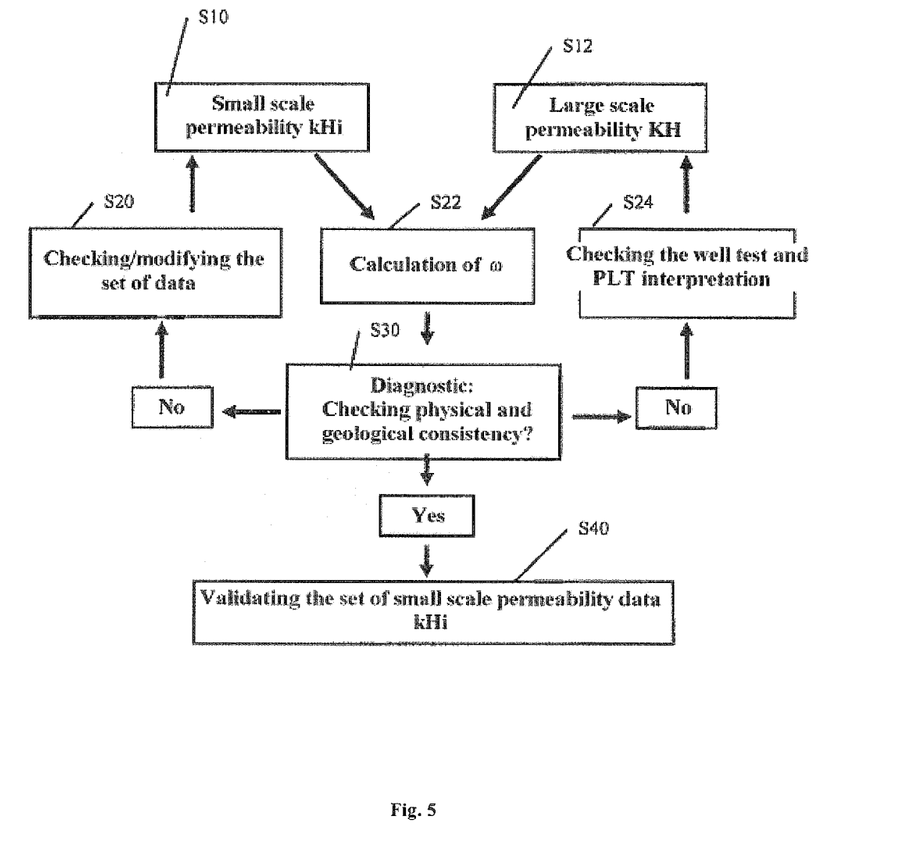
FIG. 5: a flowchart of steps of a method for conciliating data before performing scaling, according to an embodiment of the invention.

In order to describe this conciliation method in more details, reference is now made to FIG. 5, showing a flowchart of steps of the conciliation method according to an embodiment.

The flowchart reports a step S10 for providing a set of local permeability values $k_{Hi}$ of the reservoir. These data are for example obtained by coring and/or logging, as discussed above. These data are "small scale" data, the order of magnitude of the associated volume is for example of the order of 3 cm$^3$.

A value of the apparent permeability $K_H$ of the reservoir, as obtained by a well test, as stated earlier, is also provided. Typically, this permeability value is relative to a direction distinct from a direction of a well of the reservoir, for example the direction perpendicular to the direction of the well.

Moreover, in an embodiment, in addition to the small and large scale permeability values, other values may be provided. These other values for example are small scale porosity values as well as an estimation of the mean value of the ratio $k_V/k_H$ (measurements of vertical and horizontal permeabilities), this ratio measuring the petrophysical anisotropy of the reservoir.

Next, one proceeds (step S22) with numerically calculating a value of the power $\omega_H$. The value of the power is calculated from a mean power formula, for example d'Alabert's formula, i.e.:

$$K_H^{\omega_H} = \frac{1}{N} \times \sum_{i=1}^{i=N} k_{Hi}^{\omega_H},$$

which relates the apparent permeability $K_H$ to the local permeabilities via the power $\omega_H$. The calculation further uses the set of values of local permeabilities $K_{Hi}$ and of the value of the apparent permeability $K_H$ provided earlier.

As mentioned, the relevant formula is not used here for evaluating the apparent permeability $K_H$ but actually for extracting a value of the power $\omega_H$. Various algorithms may be contemplated for extracting the value of the power $\omega_H$. In particular, a scheme for inverting the mean power formula will be explained below.

Next, a step (step S30) is carried out for comparing the calculated power $\omega_H$ with at least one reference value. Typically, one tests whether the value of the calculated power $\omega_H$ belongs to an interval. This step has the purpose of establishing a diagnostic of the calculated power $\omega_H$. In particular, the physical and geological consistency of the underlying model is analyzed. This will be detailed below.

Depending on the previous comparison, a modification (step S20) of the initial set of data may be induced. For example, this is the case when the underlying model does not appear to be consistent on a physical and geological level, at the end of the diagnostic step. The relevant modification may notably consist of setting aside data according to a criterion, for example a statistical criterion. This modification may further in the extreme, consist of setting aside a complete subset of data, such as data from a log, or from a reservoir area.

Preferably, the algorithm then again loops on steps S22 and S30, until a satisfactory diagnostic is obtained, at the end of which the modified set of small scale permeability data is validated (step S40).

The result is then a set of conciliated, consistent data with the value of the apparent (large scale) permeability from the point of view of the underlying analytical model (i.e. the d'Alabert formula herein).

Figure 5A:
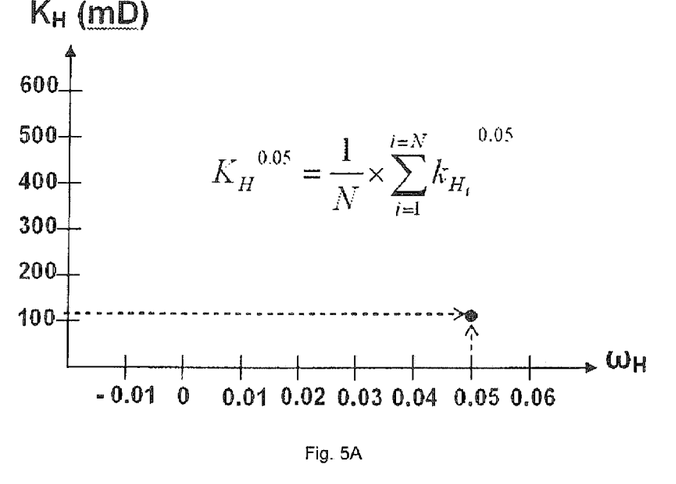
FIGS. 5A-C: application of an inversion scheme of a mean power formula relating the apparent permeability to local permeabilities via a power $\omega_H$ and numerical calculation of a value of this power $\omega_H$, for applying this conciliation method.
Figures 5B, 5C:
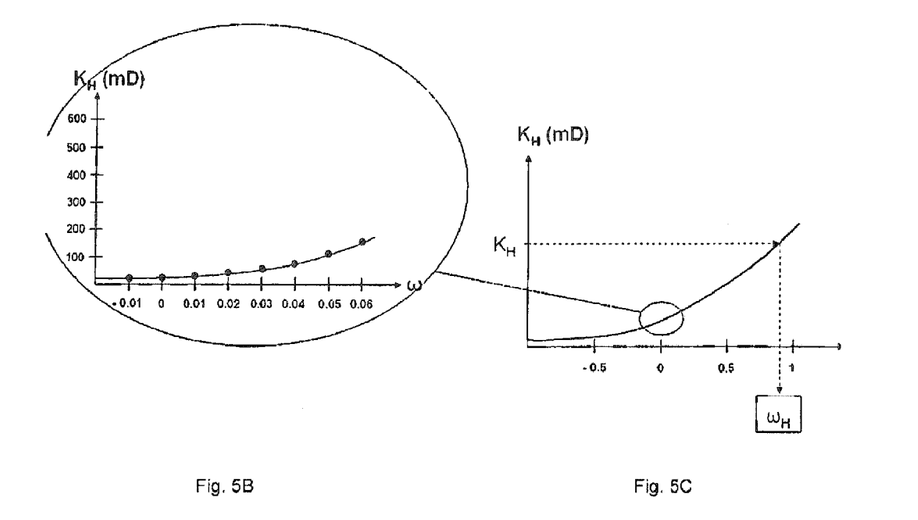

The inversion step is now explained in more details, with reference to FIGS. 5A-C.

Inversion of the formula which relates the apparent permeability $K_H$ to the local permeabilities via the power $\omega_H$, should allow the value of the power $\omega_H$ to be calculated. For example it comprises two sub-steps. The first of these sub-steps (illustrated by FIGS. 5A-B) consists of building the relationship $K_H^{\omega_H}=f(\{k_{H_i}^{\omega_H}\}_{i=1,N})$ from the sole local data. During the second of these sub-steps, a value of the power is inferred from the obtained relationship as well as from the value of the provided apparent permeability (FIG. 5C).

In more details, first of all, one proceeds with elaborating the relationship $K_H^{\omega_H}=f(\{k_{H_i}^{\omega_H}\}_{i=1,N})$ from d'Alabert's formula, i.e.

$$K_H^{\omega_H} = \frac{1}{N} \times \sum_{i=1}^{i=N} k_{H_i}^{\omega_H}.$$

This is graphically illustrated in FIGS. 5A and 5B. To do this, starting with a given set of possible values of the power $\omega_H$, a corresponding value of the apparent permeability is calculated for each of these values (for example 0.05, as in FIG. 5A), via the above relationship. A relationship is then obtained from the sole local data; so the value of the apparent permeability provided in the provision step is not used here. A "theoretical" relationship is then obtained, as illustrated in FIG. 5B. It is understood that the underlying algorithm does not need to effectively build the curve, the latter only being illustrated for facilitating understanding of the invention. In practice, this relationship may consist in a series of values of $K_H$ associated with a series of values of the power $\omega_H$, which may be noted as:

$$\{\{\omega_{H_1}, K_{H_1}\}, \{\omega_{H_2}, K_{H_2}\}, \ldots, \{\omega_{H_N}, K_{H_N}\}\}$$

If necessary, the series of $K_H$ values to be calculated may be limited to a given interval, for example in the vicinity of the provided value of $K_H$.

Next, starting with the provided value of $K_H$, a power value associated with the closest value of $K_H$ available in the series is determined. For example, when it is determined that conditions $|K_H-K_{H_k}|<|K_H-K_{H_{k-1}}|$ and $|K_H-K_{H_k}|<|K_H-K_{H_{k+1}}|$ are satisfied, then the value $\omega_{Hk}$ is sent back. A value $\omega_{Hk}$ of the power $\omega_H$ (FIG. 5C) has then been calculated.

Alternatively, the series of values of $K_H$ may for example be interpolated by a polynomial of an all the more lower order since the data are dense, and therefore preferably of order one. The relationship may then be locally inverted.

Figure 6:
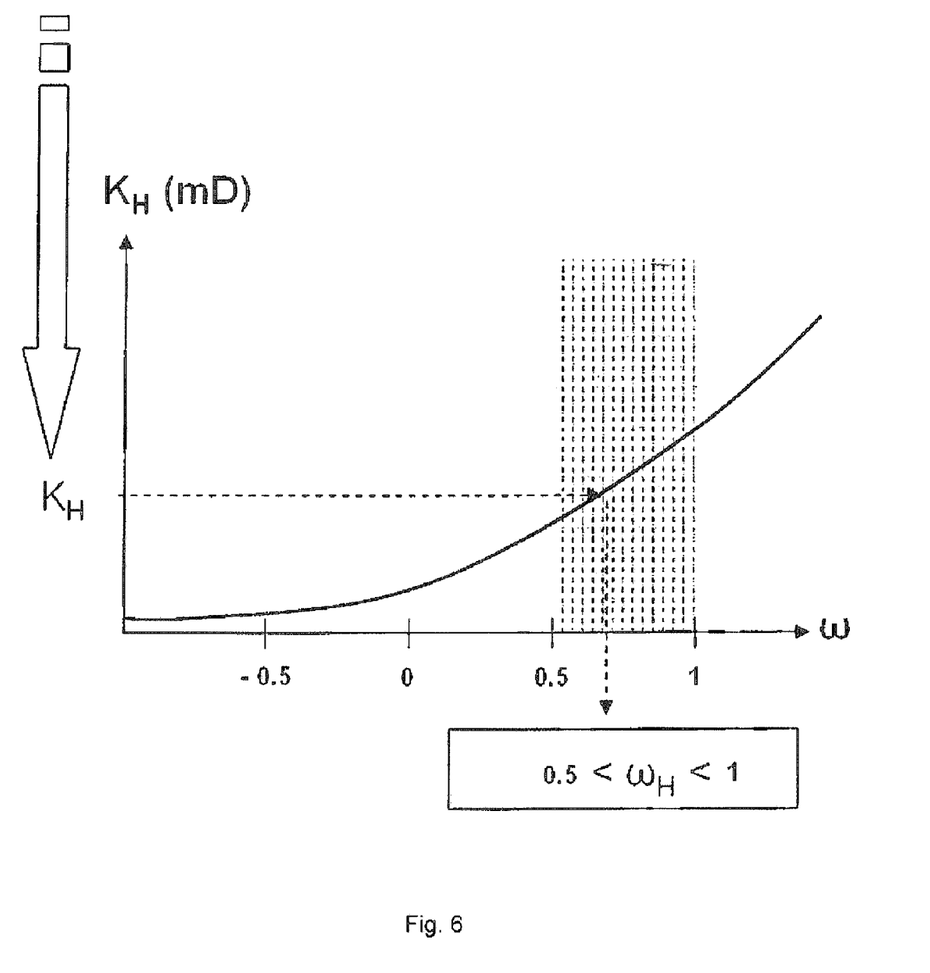
FIG. 6: a diagnostic step relative to the calculated value of the power $\omega_H$.

As announced earlier, another step relates to the diagnostic relative to the calculated value of the power $\omega_H$. The latter is now described with reference to FIG. 6, illustrating a particular embodiment. Two intervals are illustrated by distinct patterns on the curve of FIG. 6. The first illustrates an interval of values acceptable on the physical level [0, 1], the second an interval of values acceptable on the geological level [0.5, 1]. The values of the previous intervals relate to the horizontal component $\omega_H$. As regards the vertical component coy, the interval [−1, 1] should be considered on the physical level, and the interval [−1, 0] for the geological level. The value of $\omega_H$ obtained previously is for example validated by comparing the latter with at least one reference value, for example here, the acceptable upper limit. If the obtained value of $\omega_H$ is greater than 1, the local and/or apparent permeability data need to be revised (according to the proposed scheme with reference to FIG. 1). The obtained value of $\omega_H$ may, if necessary, be compared with other reference values in order to further characterize the obtained value.

Of course, variations may be contemplated as regards conciliation of data. Subsequently, the conciliated data may then be subject to other processing operations, for example a step for changing scale of the local permeability values.

In particular, the conciliated data may be provided as input data for the scaling method according to the invention. The results from these subsequent processing operations finally allow estimation of characteristics (notably of yield) of the reservoir. The exploitation of the reservoir may then be based on such results.

Other variations may be contemplated by one skilled in the art, within the scope of the appended claims. For example, as described above, an assistant may help the user in accomplishing the steps for conciliating the data and scaling the reservoir model data. This assistant may in particular provide a menu comprising sub-menus, dedicated to the conciliation and scaling tasks, respectively. These tasks however are not necessarily partitioned or ordered. For example, it is possible to contemplate an embodiment in which the user may return to conciliation of the data while he/she is processing a set of data for scaling.

In addition, although the invention is more generally described with reference to an apparent permeability $K_H$ and to a power $\omega_H$, the relevant permeability and the power are not necessarily relative to a horizontal direction perpendicular to the well direction. The invention may for example apply to other types of components or to average components of these quantities.

The invention claimed is:

1. A method for scaling data of a reservoir model, the method comprising:
defining a set of models using a computer, each model in the set including meshes with given dimensions, the meshes each including cells;
receiving statistical data relative to porosity and permeability using the computer, the statistical data including laws of porosity and permeability distributions and a variogram defined by correlation lengths $L_H$, $L_V$ along two distinct directions H, V, the laws and the variogram being applicable to each model in the set;

assigning, using the computer, cell permeability values $k_{Hi}$ and cell porosity values $\Phi_{Hi}$ depending on the statistical data;

scaling, using the computer, a mesh permeability value $K_H$ for each of the meshes, based on a mean power formula $$K_H^{\omega_H} \propto \sum k_{H_i}^{\omega_H}$$

relating the mesh permeability value $K_H$ to the cell permeability values $k_{Hi}$ of the cells via a power coefficient $\omega_H$ of having a relationship $$\omega_H = \frac{\text{Arctan}\alpha}{\pi - \text{Arctan}\alpha},$$

the power coefficient $\omega_H$ being analytically modified to correct a non-ergodicity bias due to the given dimensions of a relevant mesh by a non-ergodicity parameter depending on mesh dimensions $D_H$, $D_V$, according to the relationship $$\omega_H = \frac{\text{Arctan}\alpha}{\pi - \text{Arctan}\alpha},$$

wherein $$\alpha = \frac{L_H}{L_V} \times \sqrt{\frac{k_V}{k_H}}\,\varepsilon$$

and $$\frac{k_V}{k_H} \text{ and } \frac{L_H}{L_V}$$

designate petrophysical and geostatistical anisotropies of each model in the set, respectively, the anisotropies depending on the statistical data; and determining, using the computer, reservoir permeability and porosity values based on the set of models, using the scaled mesh permeability values.

2. The method according to claim 1, wherein the power coefficient $\omega_H$ is analytically modified by two non-ergodicity parameters $\varepsilon_V$, $\varepsilon_H$ relative to two distinct directions H, V, according to the relationship $$\omega_H = \frac{\text{Arctan}\alpha}{\pi - \text{Arctan}\alpha},$$

wherein $$\alpha = \frac{L_H}{L_V}\sqrt{\frac{k_V}{k_H}}\,\varepsilon_H, \varepsilon_V.$$

3. The method according to claim 2, wherein the two non-ergodicity parameters $\varepsilon_V$, $\varepsilon_H$ depend on respective limiting values $(D_H/L_{V/H})_{loss}$ and $(D_V/L_V)_{loss}$, below which the power coefficient $\omega_H$ varies substantially.

4. The method according to claim 3, wherein the two non-ergodicity parameters $\varepsilon_V$, $\varepsilon_H$ are also a function of a mean in and a variance σ of the reservoir permeability values the mean m and the variance σ depending on the statistical data.

5. The method according to claim 3 further comprising:
determining distributions of the two non-ergodicity parameters, $\varepsilon_V$, $\varepsilon_H$, for each of the models using an analytical model;
drawing non-ergodicity parameter values from the distributions of the two non-ergodicity parameters to obtain corrected non-ergodicity parameter values; and
determining a distribution of power coefficient values $\omega_H$ depending on the corrected non-ergodicity parameter values.

6. The method according to claim 5 further comprising:
calculating a mesh porosity value for each of the meshes; and
calculating as many corrected permeability values of each of the meshes as there are drawings of the corrected non-ergodicity parameter values.

7. The method according to claim 6, wherein the calculated mesh porosity value of each of the meshes involves an arithmetic mean of the cell porosities of the meshes.

8. The method according to claim 5, wherein more than ten of the non-ergodicity parameter values are drawn for each model in the set.

9. The method according to claim 3, wherein the two non-ergodicity parameters are expressed as a function $$\varepsilon_{V/H} = f(X_{V/H})$$

wherein $X_{V/H}$ depends on the ratio $(D_H/L_{V/H})$ of a dimension $D_{V/H}$ of the mesh to the correlation lengths and on the limiting value $(D_H/L_{V/H})_{loss}$ of the ratio, and wherein the function $$\varepsilon_{V/H} = f(X_{V/H})$$

satisfies the condition:

$$\text{Lim}\varepsilon_{V/H} \to 1 \mid_{(D_{V/H}/L_{V/H}) \to (D_{V/H}/L_{V/H})_{loss}}.$$

10. The method according to claim 9, wherein $$X_{V/H} = 1 - \frac{(D_{V/H}/L_{V/H})}{(D_{V/H}/L_{V/H})_{loss}},$$

and the function $$\varepsilon_{V/H} = f(X_{V/H})$$

is of the polynomial type:

$$\varepsilon_{V/H} = 1 + \sum_{i=1...} X_{V/H}^i.$$

11. The method according to claim 1 further comprising:
providing a set of local reservoir permeability values $k_{Hi,r}$ and an apparent permeability value $K_{H,r}$; and
calculating a power value $\omega_{H,r}$ from a mean power formula $$K_{H,r}^{\omega_{H,r}} \propto \sum k_{H,r}^{\omega_{H,r}}$$

relating the apparent permeability value $K_{H,r}$ to the local reservoir permeability values via the power value $\omega_{H,r}$ and the set of local reservoir permeability values $k_{Hi,r}$ and the apparent permeability value $K_{H,r}$;
comparing the calculated power value $\omega_{H,r}$ with a reference value; and
modifying the the set of local reservoir permeability values $k_{Hi,r}$ the apparent permeability value $K_{H,r}$ depending on the comparing operation.

12. The method according to claim 11 wherein the calculation of the power value $\omega_{H,r}$ is based on a relationship $$k^{\omega_{H,r}}/_{H,r} = f(\{k^{\omega_{H,r}}/H_i, r\}_{i=1,N})$$

from the mean power formula.

13. The method according to claim 11, wherein the apparent permeability value $K_{H,r}$ is relative to a direction distinct from a direction of a well of the reservoir.

14. The method according to claim 13, wherein the direction distinct from the direction of the well is perpendicular to the direction of the well.

15. A method comprising:
defining a set of models using a computer, each of the models including meshes having given dimensions, each of the meshes having cells;
receiving statistical data using the computer, the statistical data including laws of porosity and permeability distributions and a variogram defined by correlation lengths along distinct direction;
assigning cell permeability values and cell porosity values depending on the statistical data using the computer;
scaling a mesh permeability value for each of the meshes using the computer, the scaling based on a mean power formula relating the mesh permeability value to the cell permeability values using a power coefficient that is analytically modified to correct a non-ergodicity bias; and
determining reservoir permeability values and reservoir porosity values based on the scaled mesh permeability values using the computer.

16. A computer readable storage medium encoding a computer executable program for executing a process, the process comprising:
defining a set of models using a computer, each of the models including meshes having given dimensions, each of the meshes having cells;
receiving statistical data using the computer, the statistical data including laws of porosity and permeability distributions and a variogram defined by correlation lengths along distinct direction;
assigning cell permeability values and cell porosity values depending on the statistical data using the computer;
scaling a mesh permeability value for each of the meshes using the computer, the scaling based on a mean power formula relating the mesh permeability value to the cell permeability values using a power coefficient that is analytically modified to correct a non-ergodicity bias; and
determining reservoir permeability values and reservoir porosity values based on the scaled mesh permeability values using the computer.

* * * * *